(12) United States Patent
Fukushima

(10) Patent No.: US 9,612,600 B2
(45) Date of Patent: Apr. 4, 2017

(54) CONTROLLER OF LINEAR MOTION DEVICE AND CONTROL METHOD OF THE SAME

(71) Applicant: ASAHI KASEI MICRODEVICES CORPORATION, Tokyo (JP)

(72) Inventor: Takashi Fukushima, Tokyo (JP)

(73) Assignee: Asahi Kasei Microdevices Corporation, Tokyo (JP)

(*) Notice: Subject to any disclaimer, the term of this patent is extended or adjusted under 35 U.S.C. 154(b) by 94 days.

(21) Appl. No.: 14/396,182

(22) PCT Filed: May 8, 2013

(86) PCT No.: PCT/JP2013/002953
§ 371 (c)(1),
(2) Date: Oct. 22, 2014

(87) PCT Pub. No.: WO2013/171998
PCT Pub. Date: Nov. 21, 2013

(65) Prior Publication Data
US 2015/0130388 A1 May 14, 2015

(30) Foreign Application Priority Data

May 17, 2012 (JP) .................................. 2012-113446

(51) Int. Cl.
*G02B 7/08* (2006.01)
*G02B 7/38* (2006.01)
(Continued)

(52) U.S. Cl.
CPC .............. *G05D 3/1481* (2013.01); *G02B 7/08* (2013.01); *G05B 1/02* (2013.01); *G05B 6/02* (2013.01);
(Continued)

(58) Field of Classification Search
USPC ........................................................ 318/632
See application file for complete search history.

(56) References Cited

U.S. PATENT DOCUMENTS

| | | | |
|---|---|---|---|
| 5,389,864 A * | 2/1995 | Tryan ................... | G05B 19/351 318/562 |
| 5,932,984 A * | 8/1999 | Murakami ........... | G02B 27/646 318/268 |

(Continued)

FOREIGN PATENT DOCUMENTS

| | | |
|---|---|---|
| JP | H10-062676 A | 3/1998 |
| JP | 2007-049862 A | 2/2007 |

(Continued)

OTHER PUBLICATIONS

International Preliminary Report on Patentability dated Nov. 18, 2014, for the corresponding International application No. PCT/JP2013/002953.

(Continued)

*Primary Examiner* — Bentsu Ro
*Assistant Examiner* — Devon Joseph
(74) *Attorney, Agent, or Firm* — Morgan, Lewis & Bockius LLP

(57) ABSTRACT

The present disclosure relates to controllers of linear motion devices and control methods of the same, in particular, to a controller of a linear motion device and a control method of the same capable of controlling the position of the linear motion device accurately, in a case where a misalignment of the mounting position of a magnetic sensor or a magnetizing variation of a magnet occurs, or in a case where a magnetic field detected by the magnetic sensor receives an interference of the magnetic field generated by a driving coil of the linear motion device.

13 Claims, 12 Drawing Sheets

(51) Int. Cl.
  *G05D 3/14* (2006.01)
  *H02P 25/06* (2016.01)
  *G05B 1/02* (2006.01)
  *G05B 6/02* (2006.01)

(52) U.S. Cl.
  CPC .......... *H02P 25/06* (2013.01); *H02P 2203/00* (2013.01)

(56) References Cited

U.S. PATENT DOCUMENTS

| | | | | |
|---|---|---|---|---|
| 7,697,033 | B2 * | 4/2010 | Serikawa | H04N 5/23248 348/208.3 |
| 8,190,014 | B2 * | 5/2012 | Tsuda | G02B 7/38 396/133 |
| 2007/0091181 | A1 * | 4/2007 | Serikawa | H04N 5/23248 348/208.3 |
| 2009/0224716 | A1 | 9/2009 | Vig et al. | |
| 2010/0322612 | A1 * | 12/2010 | Tsuda | G02B 7/38 396/133 |

FOREIGN PATENT DOCUMENTS

| | | |
|---|---|---|
| JP | 2007-129700 A | 5/2007 |
| JP | 2008-191282 A | 8/2008 |
| JP | 2009-247105 A | 10/2009 |
| JP | 2010-107894 A | 5/2010 |
| JP | 2010-130860 A | 6/2010 |
| JP | 2010-191210 A | 9/2010 |
| JP | 2010-231043 A | 10/2010 |
| JP | 2011-022563 A | 2/2011 |
| JP | 2011-514133 A | 4/2011 |
| JP | 2013-099139 A | 5/2013 |

OTHER PUBLICATIONS

International Search Report dated Aug. 20, 2013 for International application No. PCT/JP2013/002953.
Supplementary European Search Report issued in European Patent Application No. 13791007.1 on May 30, 2016.

* cited by examiner

FIG. 4

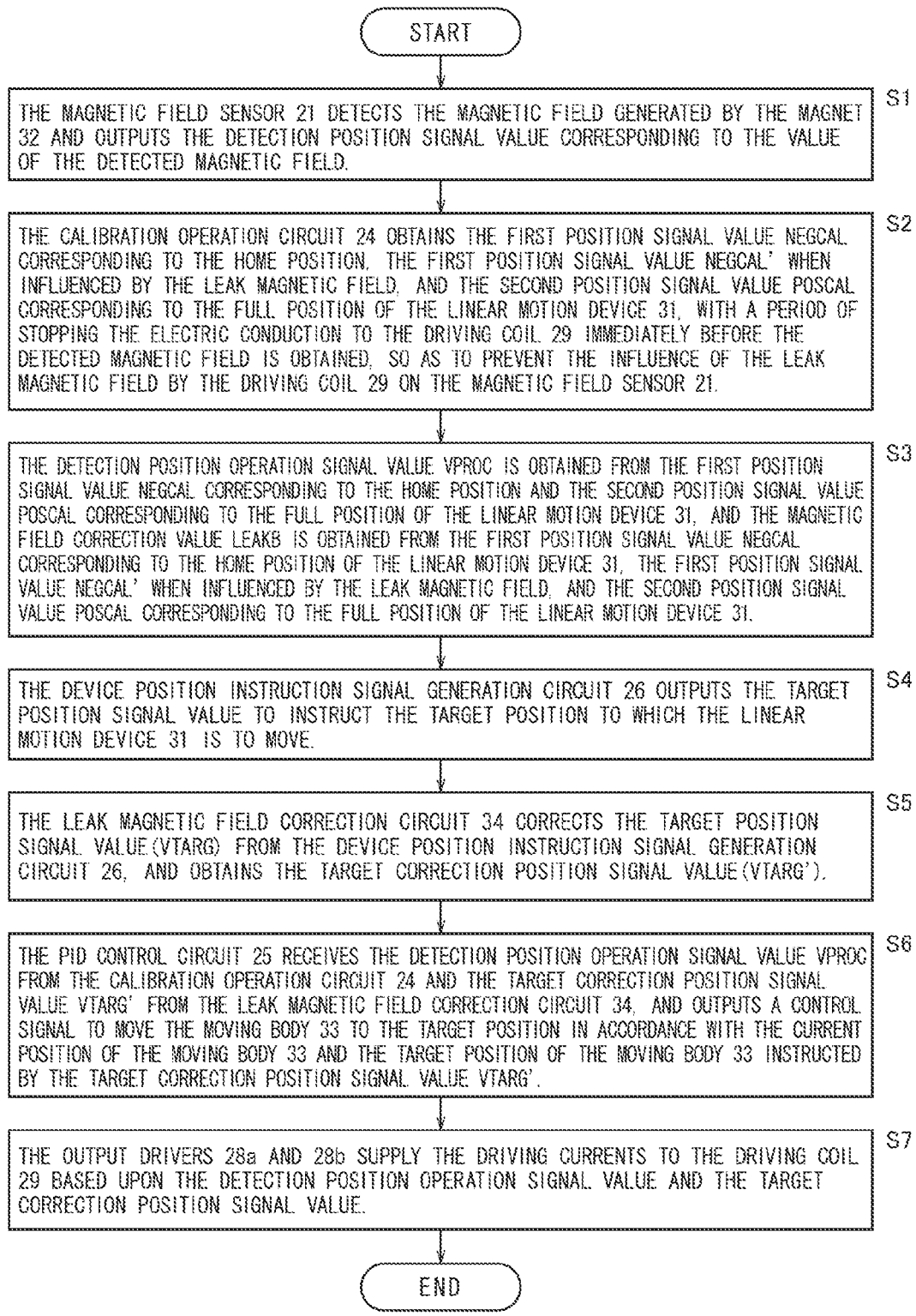

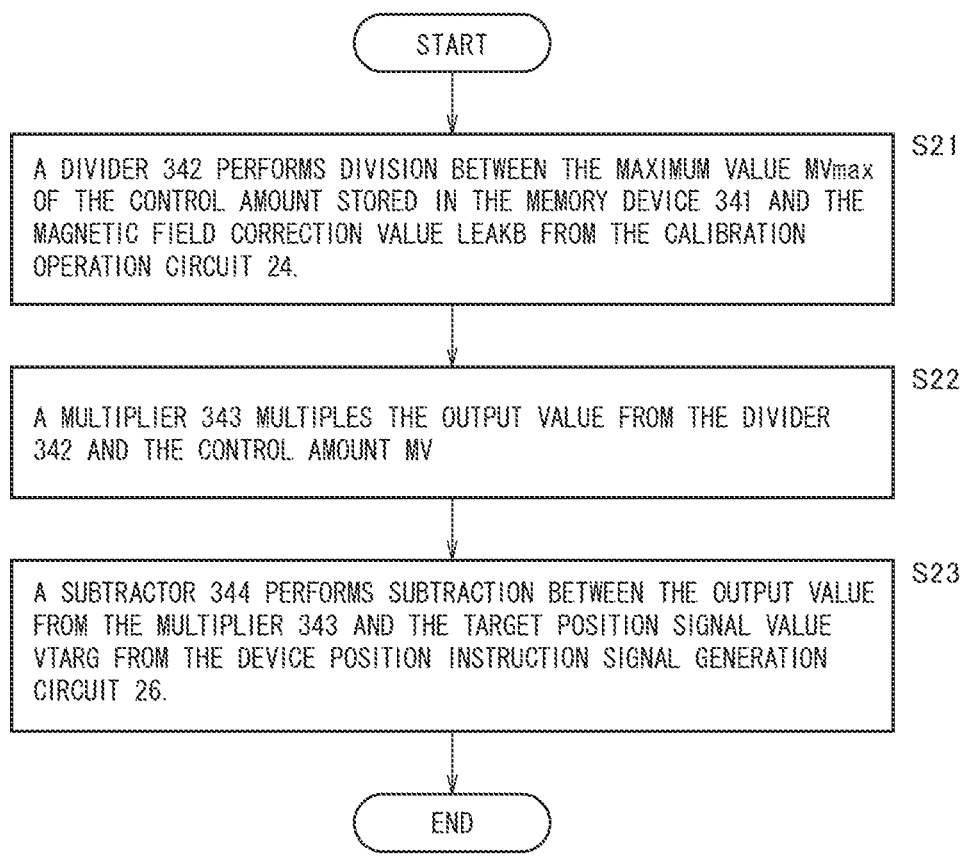

CONTROLLER OF LINEAR MOTION DEVICE AND CONTROL METHOD OF THE SAME

TECHNICAL FIELD

The present disclosure relates to controllers of linear motion devices and control methods of the same, in particular, to a controller of a linear motion device and a control method of the same capable of controlling the position of the linear motion device accurately, in a case where a misalignment of the mounting position of a magnetic sensor or a magnetizing variation of a magnet occurs, or in a case where a magnetic field detected by the magnetic sensor receives an interference of the magnetic field generated by a driving coil of the linear motion device.

BACKGROUND ART

Automatic focus functions are installed in most of camera modules mounted in general digital cameras, mobile telephones, and smartphones that are the multifunctional mobile telephones, having high compatibility with the Internet and being produced with the basis of the personal-computer functions. The automatic focus functions installed in such compact cameras adopt contrast detection methods, in many cases. The contrast detection method is a method of moving an optical lens actually, detecting the lens position where the contrast of the subject in a captured image is maximized, and moving the lens to the position.

Such a contrast detection method is achievable at lower costs than that of an active method of irradiating infrared rays or ultrasonic waves to the subject and measuring the distance to the subject from the reflected wave. However, there is a problem that it takes time to search for the lens position where the contrast of the subject is maximized. After a user presses the shutter button halfway, it is expected that a process of focusing on the subject is completed for equal to or less than 1 second.

The pixel numbers of the camera modules installed in the general digital cameras or mobile telephones are increasing year by year, and high-definition images can be taken by even these compact cameras. In an extremely precise image, defocusing is easily outstanding, and more highly precise automatic focus control is demanded.

In addition, generally speaking, the devices in which input signals and displacements in accordance with the input signals are represented by a linear function are referred to as linear motion devices. These types of linear motion devices include, for example, automatic focus lenses of cameras.

FIG. 1 is a configuration diagram illustrative of a controller of a linear motion device of one technique. A controller of a linear motion device 12 illustrated in FIG. 1 includes a magnetic field sensor 13, a differential amplifier 14, a non-inverting output buffer 15, an inverting output buffer 16, a first output driver 17, and a second output driver 18. The linear motion device 12 is feedback-controlled by the controller, and includes a lens 9 and a magnet 10.

The magnetic field sensor 13 generates a signal based upon a detected magnetic field to output it as an output signal SA. The output signal SA from the magnetic field sensor 13 and a device position instruction signal SB are input into a positive input terminal and a negative input terminal of the differential amplifier 14, respectively. A manipulated amount signal SC representing manipulated amounts (i.e., the product of deviation and the amplification degree) of output drivers 17 and 18 are output from the differential amplifier 14, to which the output signal SA from the magnetic field sensor 13 are input and the device position instruction signal SB.

The direction and amount of an electric current flowing across the coil 11 of the linear motion device 12 change according to the magnitude of the manipulated amount signal SC. The position of the linear motion device 12 including the magnet 10 changes (i.e., moves) according to the electric current flowing across the coil 11. In this situation, the output signal SA from the magnetic field sensor 13 changes in response to the movement of the magnet 10. The controller detects the position of the linear motion device 12 according to a change in the output signal SA, and performs the feedback control so that the position conforms with the position indicated by the device position instruction signal SB input from the outside.

In the linear motion device 12 illustrated in FIG. 1, here, variations in magnetization of the magnet 10 may occur. Besides, in the controller, variations in the mounting position of the magnetic field sensor 13 may occur. With these variations, the relationship between the position of the linear motion device 12 and the magnetic field detected by the magnetic field sensor 13 differ from the relationship assumed at the time of design.

FIG. 2 is a view illustrative of a relationship between a magnetic field detected by the magnetic field sensor illustrated in FIG. 1 and a position of the linear motion device. In FIG. 2, the vertical axis on the left side represents the magnetic field (hereinafter, referred to as detected magnetic field) detected by magnetic field sensor 13, and vertical axis on the right side represents values of the output signal SA from the magnetic field sensor 13. In addition, the horizontal axis of FIG. 2 represents positions of the linear motion device 12.

The solid line "a" in FIG. 2 indicates a characteristic in a case where there is no misalignment between the detected magnetic field and the position of the linear motion device 12 (just as the design value) for comparison. The dashed line "b" indicates a characteristic in a case where there is a misalignment between the detected magnetic field and the position of the linear motion device 12.

As illustrated in FIG. 2, in the case where there is a variation in magnetization of the magnet 10 or a positional misalignment of the magnetic field sensor 13, the detected magnetic field does not indicate the correct position of the linear motion device 12. For this reason, the controller is not capable of controlling the position of the linear motion device 12 appropriately, in some cases.

In other words, when the linear motion device 12 moves from an end point XBOT to another end point XTOP in the case of being just as the design value as indicated by the solid line "a", the output signal SA from the magnetic field sensor 13 changes from VMLa to VMHa (in FIG. 2, this range is represented by SA(a)). In this situation, the device position instruction signal SB ranging from VMLa to VMHa, which is a voltage range same as that of the output signal SA from the magnetic field sensor 13, is input to the controller. Then, when the device position instruction signal SB of an intermediate potential VMM (=(VMHa−VMLa)/2+VMLa) is input, the linear motion device 12 obtains an intermediate position XMID.

On the other hand, in the case where there is a variation in magnetization of the magnet 10 or the positional misalignment of the magnetic field sensor 13, the output signal SA from the magnetic field sensor 13 changes from VMLb to VMHb at an inclination different from that of the solid line "a" (in FIG. 2, an alternate long and short dash line "b"

having an inclination different from that of the solid line "a" is indicated and a range of this change is represented as SA (b)). Then, when the device position instruction signal SB of the potential VMM (=(VMHa−VMLa)/2+VMLa) is input to controller, the linear motion device 12 is to be located at the position XPOS. There is a problem that the controller is not capable of controlling the position of the linear motion device 12 correctly.

In order to solve the above problem, there is a technique that the output signal SA from the magnetic field sensor 13 and the device position instruction signal SB are synchronized with each other by correcting the output signal SA from the magnetic field sensor 13 or the device position instruction signal SB (for example, see the patent literature 1).

Additionally, the patent literature 2 is directed to a focus control circuit that determines the focal position by moving the lens actually. In the focus control circuit installed in an imaging device including a lens, a driver element for adjusting the position of the lens and a position detecting element for detecting the position of the lens, there are provided with an equalizer for generating a driving signal for aligning the lens position with a target position based upon a difference between the lens position specified by the output signal from the position detecting element and the target position of the lens set from the outside, to output the driving signal to the driver element, and an adjusting circuit for adjusting at least one of a gain or an offset of the position detecting element.

Furthermore, the patent literature 3 discloses a position signal correction circuit of a voice coil motor driving device, including an adder for receiving a position signal indicative of a position detecting sensor according to a sensor signal output from the position detecting sensor provided at a center portion or in the vicinity of the coil of a voice coil motor, and outputting a control signal for controlling the driving of the voice coil motor, and a signal attenuator for attenuating the control signal output from the adder, so that the adder adds the position signal and a reversed phase of the attenuated control signal input from the signal attenuator to output as the control signal.

CITATION LIST

Patent Literature

Patent Literature 1: JP 2009-247105 A
Patent Literature 2: JP 2011-22563 A
Patent Literature 3: JP 2010-107894 A

SUMMARY OF INVENTION

Technical Problem

In the above-described method of synchronizing the output signal SA from the magnetic field sensor or the device position instruction signal SB and the above-described method of correcting the position signal, there are the following problems.

In the method of using a correction table as disclosed in the patent literature 1, a memory device is needed for storing the correction table, and the number of the tables is 2N×N, where N is a resolving power bit number. Thus, when an integrated circuit including the correction table is produced, there is a case where the integrated circuit cannot be mounted on a small-sized linear motion device, and the production cost is increased, too. Furthermore, for creating the correction table, a task of writing the correction values into the correction table is generated while moving for each resolving power. Therefore, further increased production cost is induced.

Moreover, in the method of adjusting the gain and the offset of the position detecting element as described in the patent literature 2, the memory devices for storing information for adjustment can be reduced in number, but a D/A converter for D/A converting the gain adjustment amount and a correction circuit are needed, respectively. When the position is controlled with high accuracy, since there is a high possibility that both of the gain and the offset have to be adjusted, the number of the D/A converters and the number of the correction circuits cannot be reduced for adjusting only one of them, in many cases. Further, when the correction amount is tried to be obtained automatically, since the memory device stores digital values, the A/D converter is sometimes needed. Thus, further increased production cost is induced like the patent literature 1.

Also, in the case of the method of correcting the position signal as described in the patent literature 3, there is no means of obtaining an optimal value of the attenuation amount of the signal attenuator of attenuating the control signal output from the adder for outputting the control signal for controlling the driving of the voice coil motor. Hence, in the production process of the linear motion device, if there is a variation in amount to receive an interference of the magnetic field generated by the driving coil of the linear motion device, in the magnetic field detected by the magnetic sensor, overcorrection may occur and accurate position control cannot be carried out, in some cases.

The attenuation amount is configured to be variable and to be individually adjustable at the time of factory shipment. However, the interference amount of the magnetic field generated by the driving coil has to be detected, and the increased production cost is induced by the increased process flows.

The present invention is made in view of the above-described points, and has an object to provide a controller of a linear motion device and a control method of the same capable of controlling the position of the linear motion device accurately, in a case where the positional misalignment of a mounting position of a magnetic sensor or a magnetization variation of a magnet occurs, or in a case where a magnetic field detected by the magnetic sensor receives an interference of the magnetic field generated by a driving coil of the linear motion device.

Solution to Problem

The present invention has been made in order to achieve the above-described object, according to an aspect of the present invention, there is provided a controller of a linear motion device, the controller comprising: the linear motion device (31) having a magnet (32) attached to a moving body (33); a driving coil (29) disposed in a vicinity of the magnet (32) of the linear motion device (31), the driving coil (29) being configured to move the magnet (32); a magnetic field sensor (21) configured to detect a magnetic field generated by the magnet and configured to output a detection position signal value (Vip) corresponding to a value of a detected magnetic field; a calibration operation circuit (24) configured to obtain a detection position operation signal value (VPROC) from a first position signal value (NEGCAL) corresponding to a first position of the linear motion device and a second position signal value (POSCAL) corresponding to a second position of the linear motion device (31), based upon the detection position signal value (Vip) from the magnetic field sensor (21); a device position instruction signal generation circuit (26) configured to output a target position signal value (VTARG) to instruct a target position to which the linear motion device moves; an output driver configured to supply a driving current to the driving coil based upon the detection position operation signal value (VPROC) and the target position signal value (VTARG); and a leak magnetic field correction circuit (34) configured to correct a detection error of the magnetic field sensor (21) due to a leak magnetic field of the driving coil (29) based upon a difference between the detection position signal value (Vip) when an electric power is not supplied to the driving coil (29) and the detection position signal value (Vip) when the electric power is not supplied to the driving coil (29).

Advantageous Effects of Invention

According to some embodiments of the present invention, in a case where a misalignment of the mounting position of a magnetic sensor or a magnetization variation of a magnet occurs, or in a case where a magnetic field detected by the magnetic sensor receives an interference of the magnetic field generated by a driving coil of the linear motion device, it is possible to achieve a controller of a linear motion device and a control method of the same capable of controlling the position of the linear motion device accurately.

BRIEF DESCRIPTION OF DRAWINGS

FIG. 4 is a configuration view concretely illustrative of a calibration operation circuit illustrated in FIG. 3;

FIG. 10 is a view of a flowchart illustrative of a control method of the linear motion device in some embodiments of the present disclosure;

FIG. 12 is a view of a flowchart illustrative of an operation method, by the leak magnetic field correction circuit.

DESCRIPTION OF EMBODIMENTS

Hereinafter, some embodiments of the present disclosure will be described with reference to the drawings.

Figure 1:
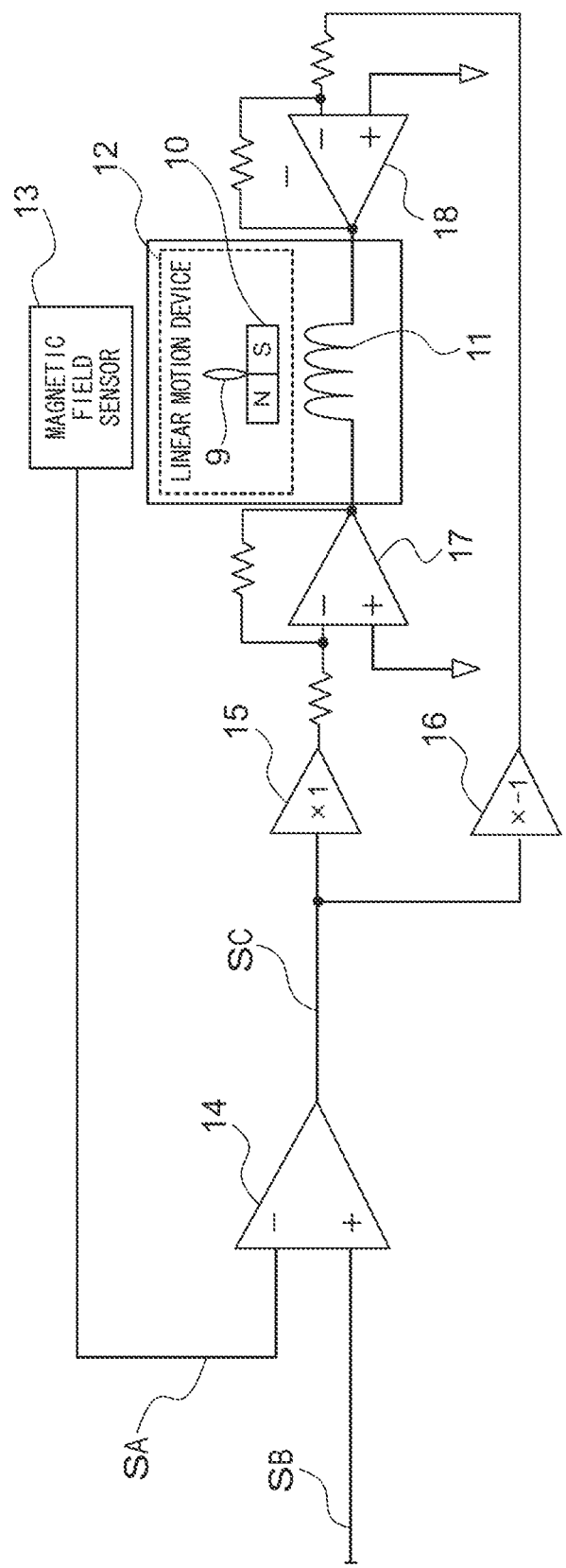
FIG. 1 is a configuration view illustrative of a controller of a linear motion device of one technology.
Figure 2:
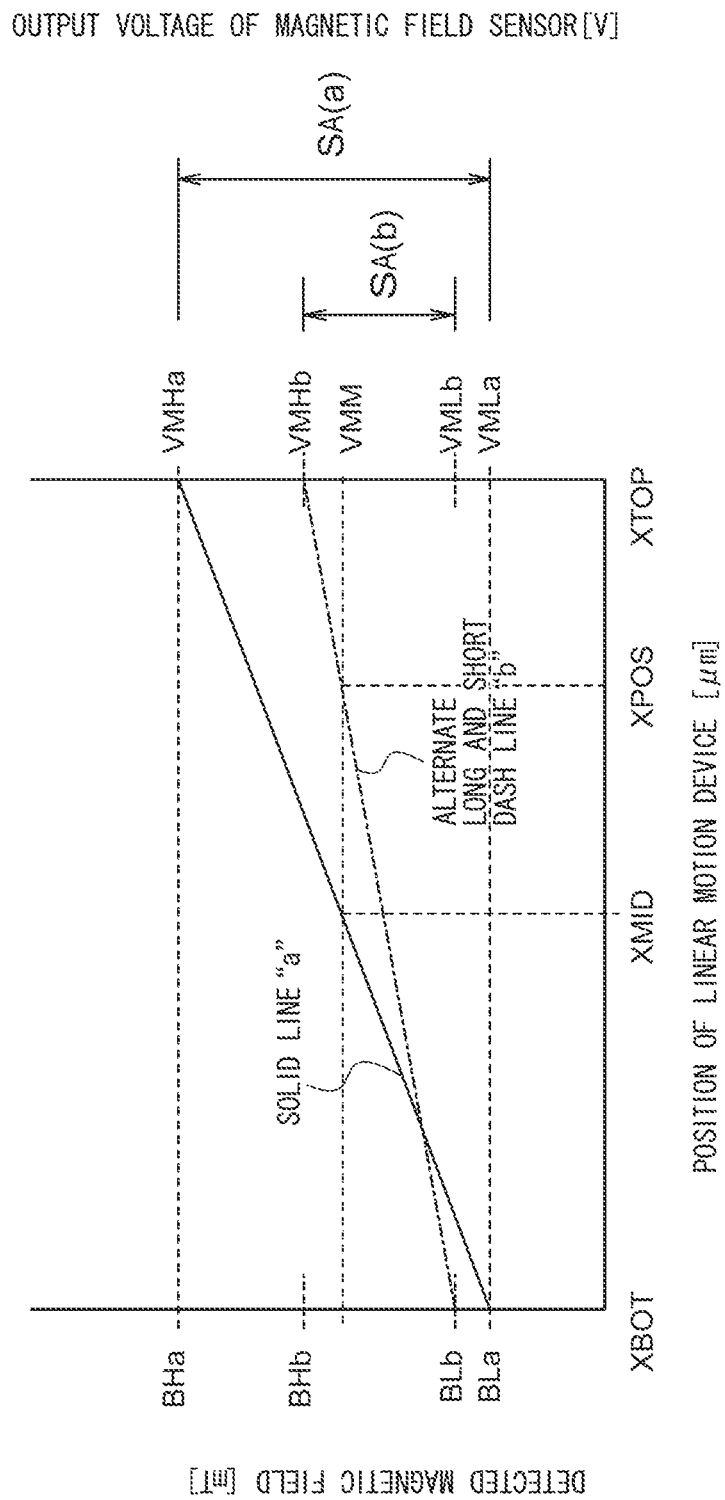
FIG. 2 is a view illustrative of a relationship between a magnetic field detected by a magnetic field sensor and a position of the linear motion device illustrated in FIG. 1.
Figure 3:
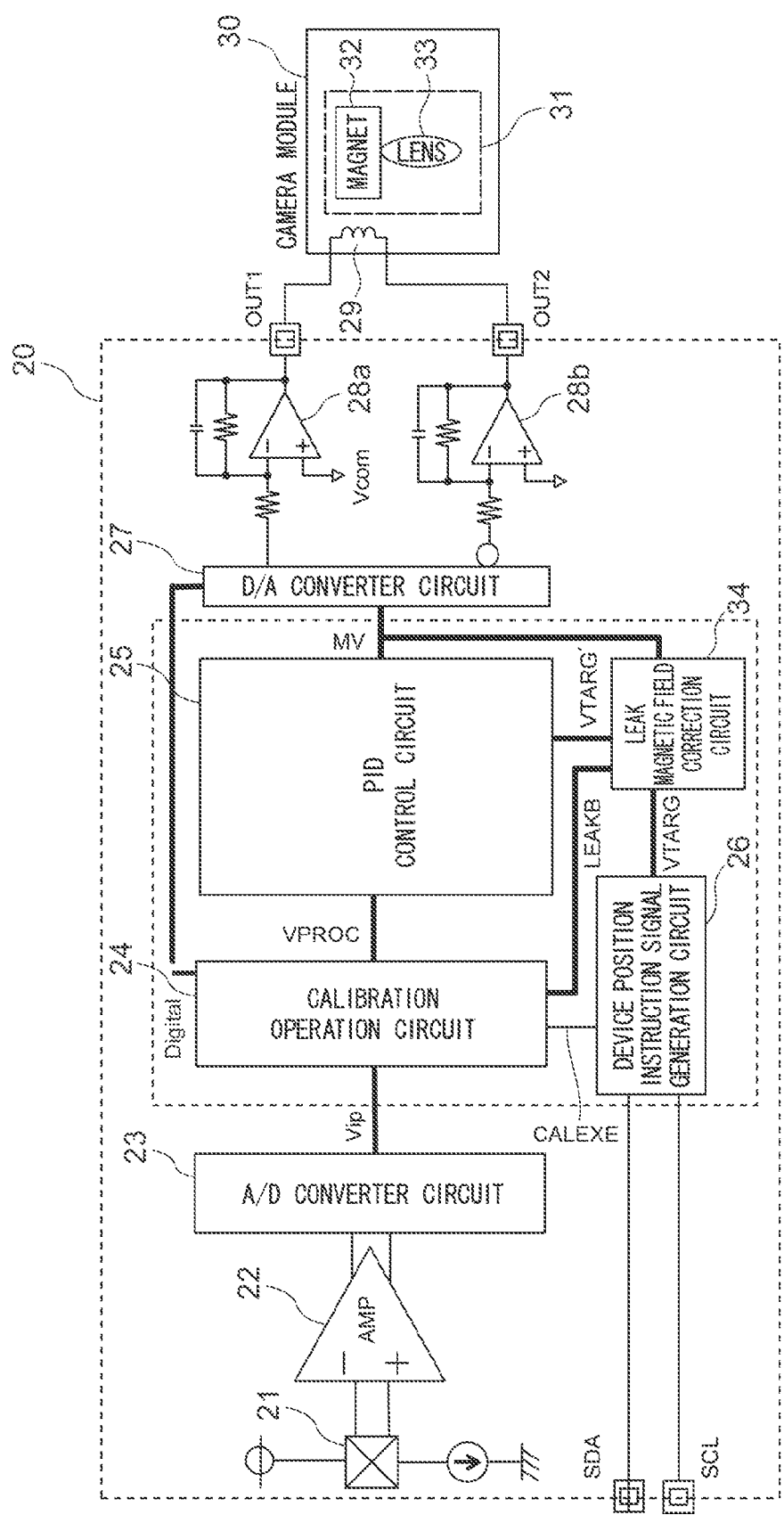
FIG. 3 is a configuration view illustrative of the controller of the linear motion device in some embodiments of the present disclosure.

FIG. 3 is a configuration view illustrative of the controller of the linear motion device, in some embodiments of the present disclosure. In FIG. 3, a case where a controller 20 for adjusting the position of the lens is used with a camera module 30 will be described. The controller (i.e., a position control circuit) 20 is configured as, for example, an IC circuit. Specifically, the camera module 30 is configured with a linear motion device 31, and a driving coil 29 for moving a lens 33. Thus, a magnet 32 is moved by causing an electric current to flow across the driving coil 29, so that the position of the lens 33 secured to the magnet 32 is adjustable.

In other words, in some embodiments of the present disclosure, the controller 20 of the linear motion device 31 encompasses the linear motion device 31 having the magnet 32 attached to the lens (i.e., a moving body) 33, and the driving coil 29 disposed in the vicinity of the magnet 32 of the linear motion device 31, and is configured to move the magnet 32 by a power generated by the coil current flowing across the driving coil 29.

A magnetic field sensor 21 detects the magnetic field that the magnet 32 generates, and outputs a detection position signal value Vip corresponding to the value of the detected magnetic field. In other words, the magnetic field sensor 21 converts the magnetic field that the magnet 32 of the camera module 30 generates into an electric signal, and outputs the detection position signal to an amplifier 22. The amplifier 22 amplifies the detection position signal input from the magnetic field sensor 21. In one embodiment, the magnetic field sensor 21 is a Hall element.

In addition, an A/D converter circuit 23 performs an A/D conversion on the detection position signal supplied from the magnetic field sensor 21 and amplified by the amplifier 22, so as to obtain an A/D-converted detection position signal value Vip.

The controller 20 of the linear motion device 31, in some embodiments of the present disclosure, is provided with a measure of preventing a detection error occurred by the influence of the leak magnetic field, after the magnetic field sensor 21 is influenced by the leak magnetic field of the driving coil 29. For this reason, the calibration operation circuit 24 has a period of stopping the electric conduction to the driving coil 29 immediately before the detected magnetic field is obtained to prevent the influence of the leak magnetic field of the driving coil 29 on the magnetic field sensor 21. The calibration operation circuit 24 obtains a detection position operation signal value VPROC from a first position signal value NEGCAL corresponding to the home position of the linear motion device 31 and a second position signal value POSCAL corresponding to the full position of the linear motion device 31, based upon the A/D-converted detection position signal value Vip. Immediately before the time to stop the electric conduction to the driving coil 29 to obtain the amount of the leak magnetic field, the calibration operation circuit 24 is configured to obtain a third position signal value NEGCAL' corresponding to the home position of the linear motion device 31 when influenced by the leak magnetic field (or a position signal value POSCAL' corresponding to the full position of the linear motion device 31 when influenced by the leak magnetic field), based upon the A/D-converted detection position signal value Vip.

In addition, the calibration operation circuit 24 operates such that the detection position operation signal value VPROC has a relationship of VPROC=(Vip−NEGCAL)/(POSCAL−NEGCAL)×511, where Vip is the detection position signal value from the magnetic field sensor 21, and is an input signal value to the calibration operation circuit 24, NEGCAL is the first position signal value corresponding to the initial position, POSCAL is the second position signal value corresponding to the full position, and VPROC is the detection position operation signal value that is an output signal value from the calibration operation circuit 24.

In addition, the calibration operation circuit 24 operates such that a relationship of LEAKB=(NEGCAL'−NEGCAL)/(POSCAL−NEGCAL)×511 or LEAKB=(POSCAL−POSCAL')/(POSCAL−NEGCAL)×511 is satisfied, where Vip is a detection position signal value from the magnetic field sensor 21, and is an input signal value to the calibration operation circuit 24, NEGCAL is the first position signal value corresponding to the initial position, POSCAL is the second position signal value corresponding to the full position, and NEGCAL' is the third position signal corresponding to the home position when influenced by the leak magnetic field (or POSCAL' is a position signal corresponding to the full position when influenced by the leak magnetic field), and LEAKB is a magnetic field correction position that is an output signal value from the calibration operation circuit 24. It is to be noted that 511 is a numerical value indicating $2^9-1$ and presents a proportionality coefficient by the binary scale.

Further, a device (lens) position instruction signal generation circuit 26 is configured to output a target position signal value VTARG for instructing a target position to which the linear motion device 31 is to move and a calibration execution signal CALEXE, and is connected to a PID control circuit 25 and the calibration operation circuit 24. In other words, the lens position instruction signal generation circuit 26 generates the target position signal value VTARG for instructing the target position of the lens 33 and the calibration execution signal CALEXE for instructing the calibration execution instruction given from the outside to the calibration operation circuit.

The leak magnetic field correction circuit 34 is connected to the device position instruction signal generation circuit 26 and the calibration operation circuit 24, and is configured to correct a detection error of the magnetic field sensor 21 by the leak magnetic field of the driving coil 29.

Further, the PID control circuit 25 is connected to the calibration operation circuit 24 and the leak magnetic field correction circuit 34, and receives the detection position operation signal value VPROC from the calibration operation circuit 24 and a target correction position signal value VTARG' from the leak magnetic field correction circuit 34, so as to output a control signal to move the lens 33 to the target position from the current position of the lens (i.e., the moving body) 33 and the target position of the lens 33 instructed by the target correction position signal value VTARG'.

Herein, the PID control is one kind of feedback control, and is a method of performing control of the input value by use of three elements including a deviation of an output value to a target value, and an integration and a differential of the deviation. Proportional control (i.e., P control) can be mentioned as a basic feedback control. This is to control the input value as a linear function of the deviation of the output value to the target value. In the PID control, Proportional action or P action (where P is an abbreviation of Proportional) represents an operation of changing the input value in proportion to the deviation. That is, if a state with the deviation continues for a long time, a change in the input value is increased in accordance with such a long time so as to serve a function of becoming closer to the target value. Integral action or I action (where I is an abbreviation of Integral) represents an action of changing the input value in proportion to the integration of the deviation. Thus, the PI control refers to a control method of combining the proportional action and the integral action. Derivative action or D action (where D is an abbreviation of Derivative or Differential) represents an action of changing the input value in proportion to the differential of the deviation. The PID control refers to a control method of combining the Proportional action, the Integral action, and the Derivative action.

An output signal from the PID control circuit 25 is subjected to D/A conversion by a D/A converter circuit 27. A first output driver 28a and a second output driver 28b supply driving currents to the driving coil 29 based upon the detection position operation signal value VPROC and the target correction position signal value VTARG'. In other words, the first and second output drivers 28a and 28b generate output signals Vout1 and Vout2, respectively, based upon the control signal from the PID control circuit 25. The output signals Vout1 and Vout2 are respectively supplied to both ends of the driving coil 29 of the camera module 30.

In the description heretofore, it is assumed that the linear motion device is configured with the lens (i.e., the moving body) 33 and the magnet 32 attached to lens (i.e., the moving body) 33. However, the linear motion device includes a driving coil, in some embodiments of the present disclosure.

In this manner, even if the detection position signal value Vip has a variation, or even if the magnetic field detected by the magnetic sensor is influenced by the interference of the magnetic field generated by the driving coil of the linear motion device, the target position signal value VTARG enables the position control of the linear motion device 31.

Figure 4:
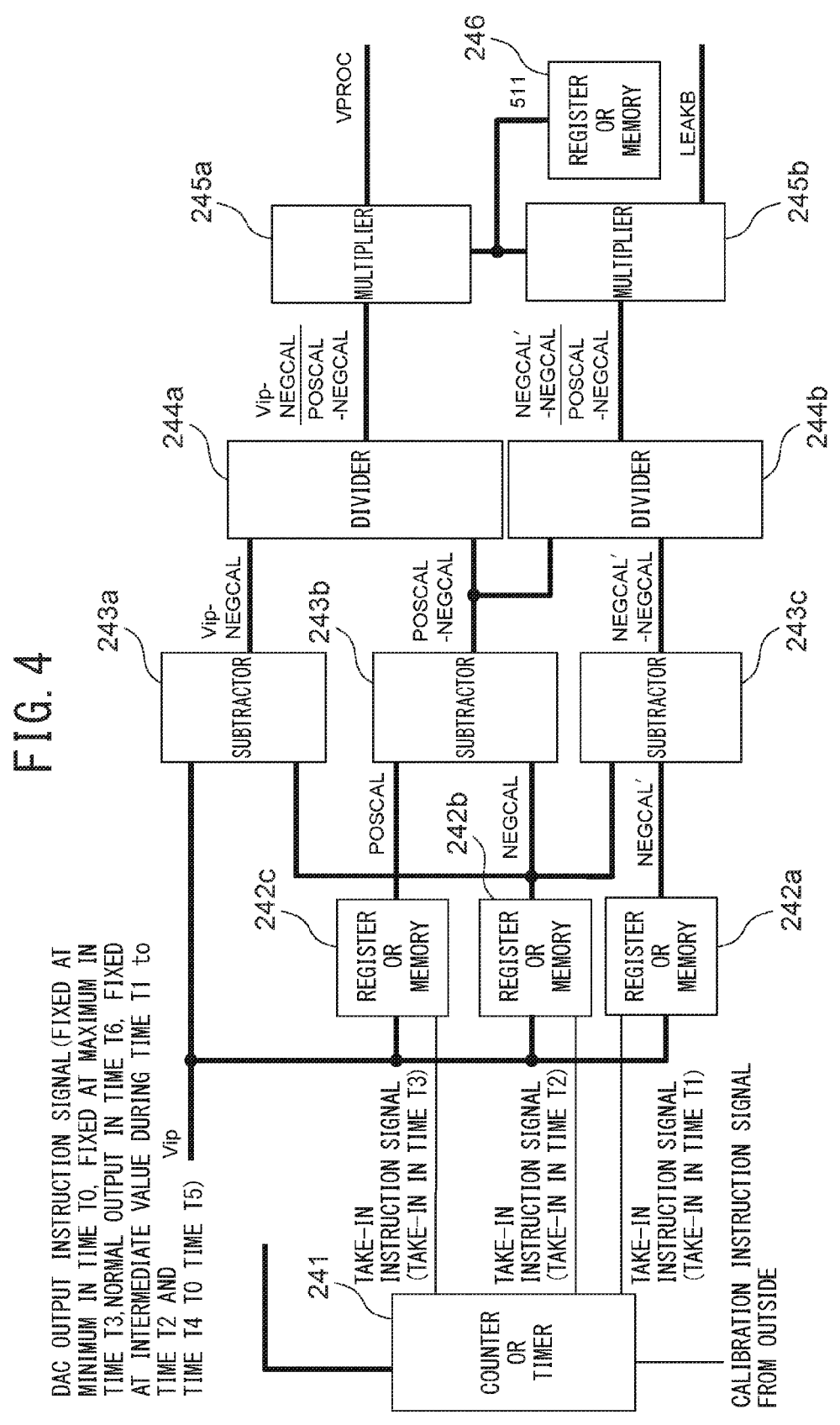

FIG. 4 is a configuration view concretely illustrative of a calibration operation circuit illustrated in FIG. 3. The calibration operation circuit 24 includes: a counting circuit (i.e., a counter/timer) 241 configured to operate when a calibration instruction signal is input from the outside; and a first memory device (i.e., a register/memory) 242a configured to store the detection position correction signal value as a stored value NEGCAL', when an output signal of the D/A conversion indicates that the output of the D/A conversion is fixed to the minimum value, and electric power is supplied to the driving coil 29, the counting circuit 241 counts up to a first time T1, and a take-in instruction signal is issued. After the stored value NEGCAL' is stored, an instruction is given such that the output signal of the D/A conversion is fixed to an intermediate value (in the case where the output of the D/A conversion is an intermediate value, the outputs from the output drivers 28a and 28b are also intermediate values so that the difference of applied potentials between the both ends of the coil 29 is zero. In other words, the supply of electric power to the coil 29 is stopped).

The calibration operation circuit 24 also includes: a second memory device (i.e., a register/memory) 242b configured to store the detection position signal value as a stored value (NEGCAL), when the counting circuit counts up to a second time and a take-in instruction signal is issued; and a third memory device (i.e., a register/memory) 242c that stores the detection position signal value as a stored value POSCAL, after the stored value NEGCAL is stored, the output signal of the D/A conversion indicates the minimum value, and the output of the D/A conversion indicates that the output of the D/A conversion is fixed at the maximum value, and electric power is supplied to the driving coil 29 when a third time is counted, then the output signal of the D/A conversion indicates a value fixed at the intermediate value when the counting circuit 241 counts up to a fourth time T4, and the counting circuit 241 counts up to a fifth time so that a take-in instruction signal is issued. After the stored value POSCAL is stored, the output signal of the D/A conversion indicates the maximum value, and the output instruction of the D/A conversion generates an output instruction based upon the output from the PID control circuit 25 when a sixth time is counted, and the counting circuit 241 stops counting.

The calibration operation circuit 24 also includes: a first subtractor 243a configured to subtract the stored value NEGCAL of the second memory device 242b from the detection position signal value Vip from the magnetic field sensor 21; a second subtractor 243b configured to subtract the stored value NEGCAL of the second memory device 242b from the stored value POSCAL of the third memory device 242c; a third subtractor 243c configured to subtract the stored value NEGCAL of the second memory device 242b from the stored value NEGCAL' of the first memory device 242a; a first divider 244a that divides an output value (Vip−NEGCAL) from the first subtractor 243a by an output value (POSCAL−NEGCAL) from the second subtractor 243b; and a second divider 244b that divides an output value (NEGCAL'−NEGCAL) from the third subtractor 243c by an output value (POSCAL−NEGCAL) from the second subtractor 243b. A detection position operation signal value VPROC of the calibration operation circuit 24 has a proportional relationship to (Vip−NEGCAL)/(POSCAL−NEGCAL) and a magnetic field correction value LEAKB has a proportional relationship to (NEGCAL'−NEGCAL)/(POSCAL−NEGCAL).

As the output signal from the first divider 244a, VPROC=(Vip−NEGCAL)/(POSCAL−NEGCAL)×511 is obtained through a first multiplier 245a. In addition, as the output signal from the second divider 244b, LEAKB=(NEGCAL'−NEGCAL)/(POSCAL−NEGCAL)×511 is obtained through a second multiplier 245b.

It is to be noted that LEAKB=(POSCAL−POSCAL')/(POSCAL−NEGCAL)×511, in some embodiments. Also, the fourth memory device (i.e., a register/memory) 246 is connected to the multipliers 245a and 245b, and "511" is stored. The "511" is arbitrarily changed according to a configurable range of the target position signal value VTARG.

Further, the operations of the position operation signal VPROC and the magnetic field correction position LEAKB are performed by dedicated hardware illustrated in FIG. 4, in one embodiment, or are performed by a general-purpose one such as a microcomputer or software, in another embodiment.

In the illustration of FIG. 4, the description has been given that the D/A converter circuit 27 outputs an intermediate value as a means of stopping the electric power supply to the coil 29. However, the present disclosure is not limited to the above means. The normal output terminal and the inverting output terminal of the D/A converter circuit 27 are fixed to be the same outputs, in some embodiments, or the electric power supply is stopped by turning off output drivers 28a and 28b, not illustrated, by using a control signal to directly give instructions to the output driver 28a and 28b, in some embodiments.

In the following discussion, similarly, a means to output an intermediate value typically is used.

Figure 5:
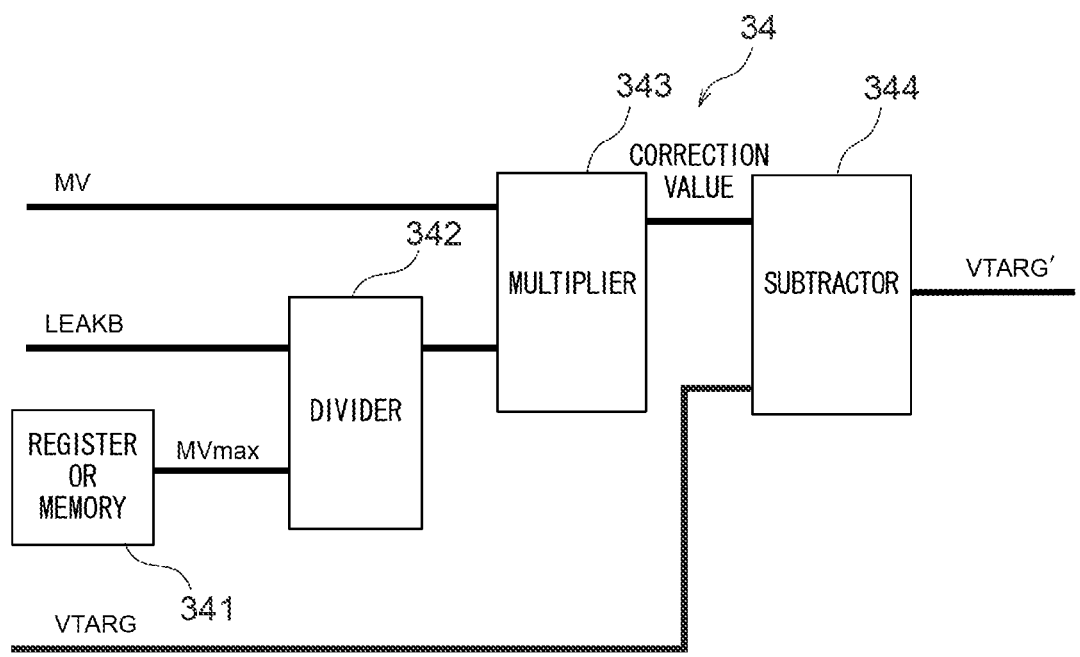
FIG. 5 is a configuration view concretely illustrative of a leak magnetic field correction circuit illustrated in FIG. 3.

FIG. 5 is a configuration view concretely illustrative of a leak magnetic field correction circuit illustrated in FIG. 3.

The leak magnetic field correction circuit 34 includes: a divider 342 configured to perform division between the maximum value MVmax of the control amount stored in the memory device 341 and the magnetic field correction value LEAKB from the calibration operation circuit 24; a multiplier 343 that multiplies the output value from the divider 342 and the control amount MV; and a subtractor 344 that performs subtraction between the output value from the multiplier 343 and the target position signal value VTARG from the device position instruction signal generation circuit 26, so as to output the target correction position signal value VTARG'.

A value corresponding to the denominator of the division to be stored in a register or memory is the maximum value that MV takes. That is the maximum value of the D/A converter circuit 27, and is same with a value when moved to an end point at the time of calibration. The target correction position signal VTARG' is calculated from the stored MV value, the MV value of the PID output, and the magnetic field correction value LEAKB from the calibration operation circuit 24, by use of the subtractor 344, the divider 342, and the multiplier 343. The calculation is performed by dedicated hardware illustrated in FIG. 5, in some embodiments, or is performed by a general-purpose one such as a microcomputer or software. The current flowing across the coil is proportional to the control amount MV, and it is possible to calculate the amount of the leak magnetic field from the control amount MV. Since the magnetic field correction value LEAKB is synchronized with the target position signal VTARG, it is made possible to reduce the influence of the magnetic field by performing the position control with the target correction position signal VTARG', which is obtained by subtracting the operated correction value from the target position signal VTARG, being as the target value, and it is possible to improve the accuracy of the position control.

Thus, it is possible to calculate the leak magnetic field generated by the driving coil from the control amount, by dividing the value of the leak magnetic field obtained at the time of calibration (the largest current conduction in a plus direction or a minus direction) by the maximum control amount MV to set the divided value to a coefficient. The influence of the leak magnetic field is cancelable by subtracting the leak magnetic field amount from the target position signal value VTARG. The magnetic field correction value LEAKB is obtained from a calibration result, in some embodiments, and variations between units are also cancelable. Additionally, since the magnetic field correction value LEKB is calculated by a subtractor, a divider, and a multiplier from the stored NEGCAL value and NEGCAL' value, the calculated magnetic field correction value LEAKB is synchronized with the target position signal value VTARG, and even if the influence of the leak magnetic field varies, the correction amount is appropriately obtainable.

Figures 6A, 6B:
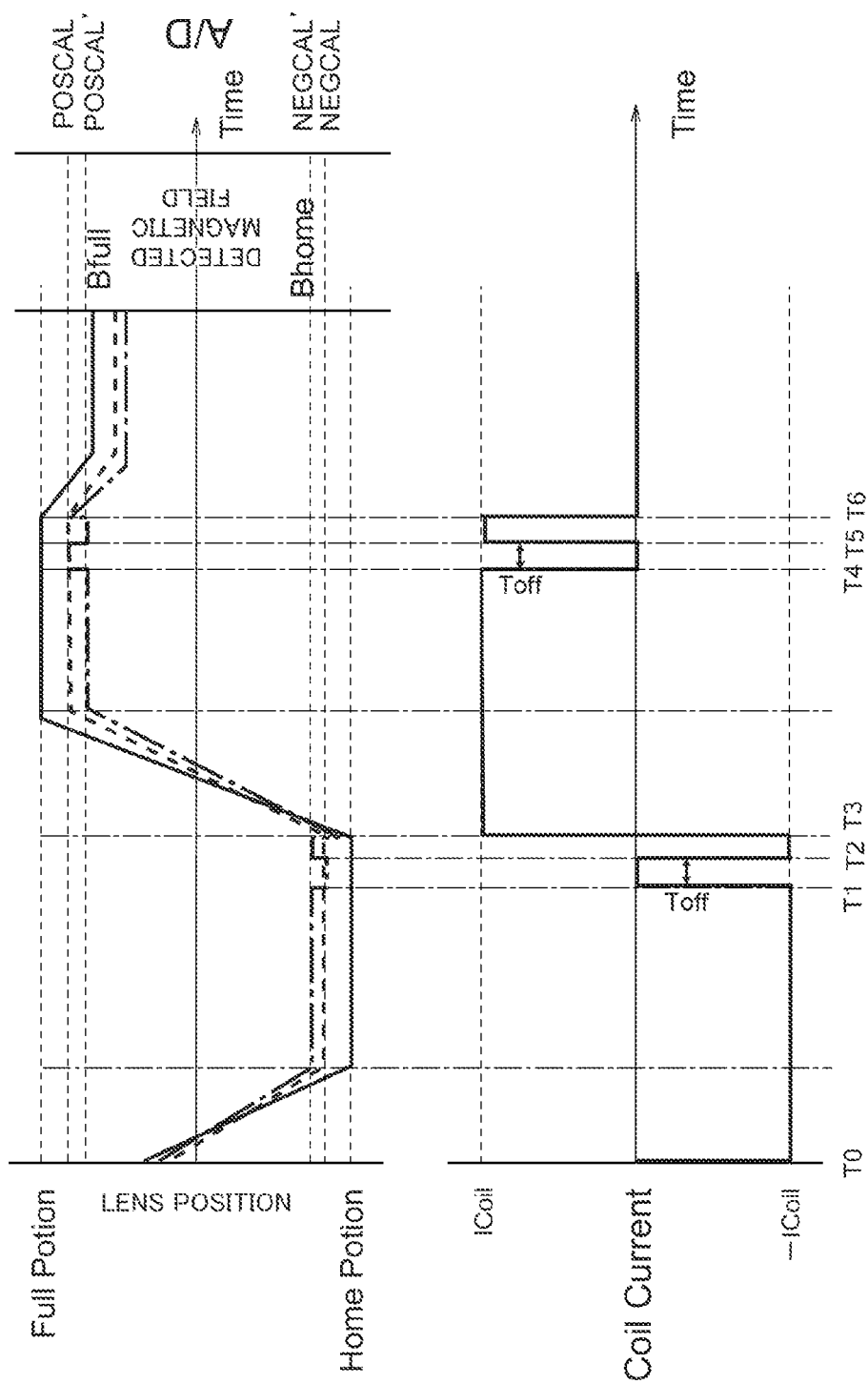
FIG. 6A and FIG. 6B are views illustrative of relationships between a driving coil electric current and a lens position with the passage of time at the operation of calibration when influenced by the leak magnetic field.

FIG. 6A and FIG. 6B are views illustrative of other relationships between a driving coil electric current and a lens position with the passage of time when influenced by the leak magnetic field. In order to avoid the influence of the leak magnetic field by the driving coil 29 on the magnetic field sensor 21, there is a period of stopping the electric power supply to the driving coil 29 immediately before the detected magnetic field is obtained. FIG. 6A is a view illustrative of relationships between the detected magnetic fields corresponding to the home position (Home Position) and the full position (Full Position) of the lens position as well as NEGCAL and POSCAL, and FIG. 6B is a view illustrative of a driving coil electric current with the passage of time.

In the drawings, a dashed line indicates a relationship between the detected magnetic field and the lens position when influenced by the leak magnetic field, and a broken line indicates a relationship between the detected magnetic field and the lens position when the influence of the leak magnetic field is avoided, in some embodiments of the present disclosure. The detection position signal value Vip corresponding to the home position when influenced by the leak magnetic field is stored as a stored value NEGCAL' in the first memory device (i.e., the register/memory) 242a, the detection position signal value Vip corresponding to the home position when the influence of the leak magnetic field is avoided is stored as a stored value NEGCAL in the second memory device (i.e., the register/memory) 242b, and the detection position signal value Vip corresponding to the full position when the influence of the leak magnetic field is avoided is stored as a stored value POSCAL in the third memory device (i.e., the register/memory) 242c.

Time Toff from stoppage of electric power supply to obtaining of the detected magnetic field has a relationship of being sufficiently longer than an electrical time constant of the coil and shorter than a mechanical time constant of the linear motion device.

Figures 7A, 7B:
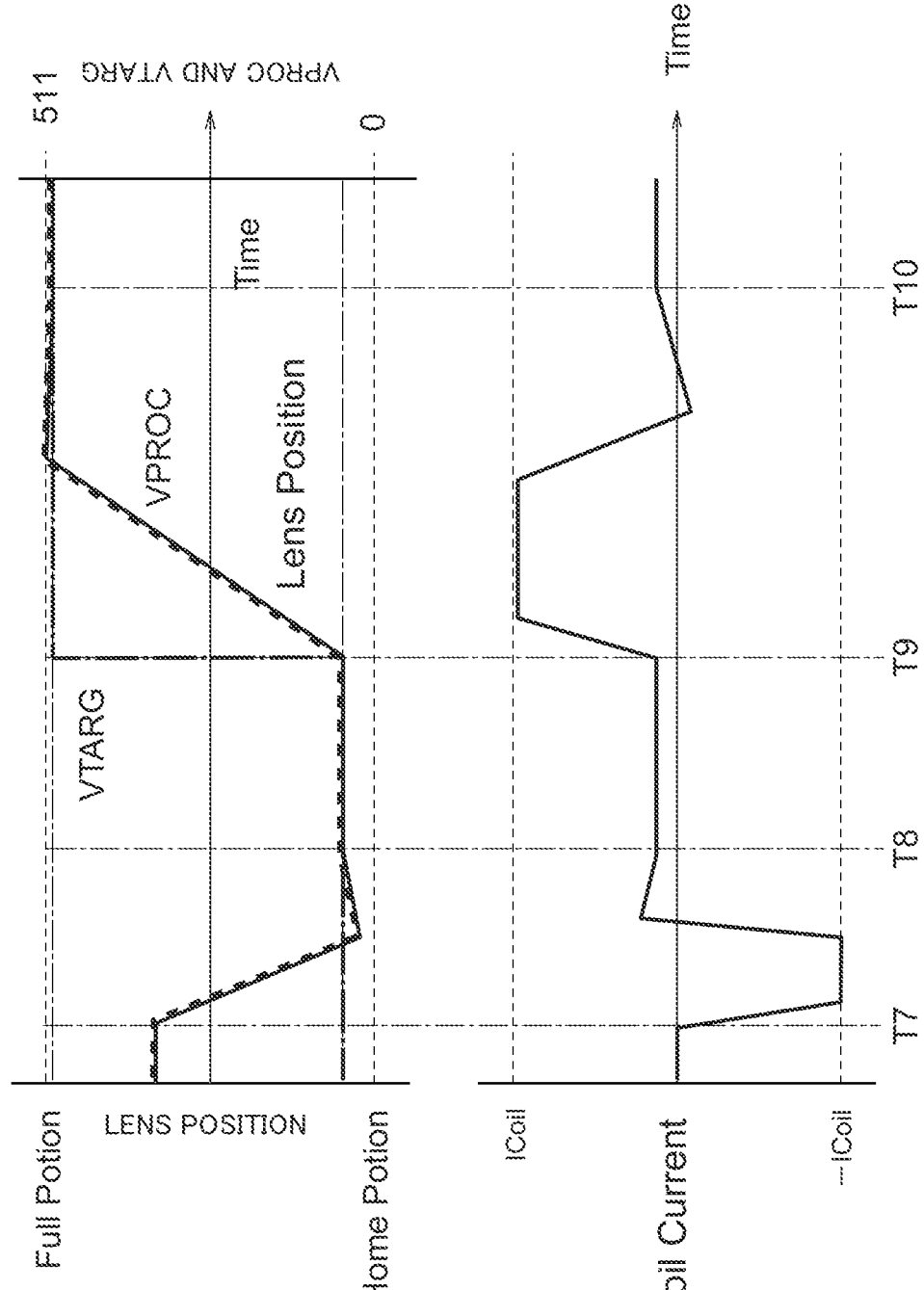
FIG. 7A and FIG. 7B are views illustrative of relationships between the driving coil electric current and the lens position control with the passage of time at the operation of position control when not influenced by the leak magnetic field.

FIG. 7A and FIG. 7B are views illustrative of relationships between the driving coil electric current and the lens position control with the passage of time at the operation of position control, when not influenced by the leak magnetic field. FIG. 7A is a view illustrative of relationships between the detection position operation signal VPROC and the target position signal VTARG corresponding to the home position (i.e., Home Position) and the full position (i.e., Full Position) of the lens position with the passage of time, and a solid line indicates the lens position, a dotted line indicates the position operation signal VPROC, and a dashed line indicates the target position signal VTARG. FIG. 7B is a view illustrative of a driving coil electric current with the passage of time.

When not influenced by the leak magnetic field, the PID control circuit 25 controls the position operation signal VPROC and the target position signal VTARG to be equal to each other, and the lens position according to the target position signal VTARG is stabled in time T8. As to the driving coil electric current at this time, the current begins to be supplied to move the lens to the home position from time T7 when the position control starts, and only the electric current necessary to hold the lens position in T8 is supplied when the lens position becomes stable.

Further, when the target position signal VTARG is changed in time T9, the lens position is stabled at the lens position corresponding to the target position VTARG in time T10 by the control of the PID control circuit 25 again. The driving coil electric current at this time begins to supply the electric current to move the lens to the full position from time T9 when the target position is changed, and only the electric current necessary to hold the lens position is supplied in time T10 when the lens position becomes stable.

Figures 8A, 8B:
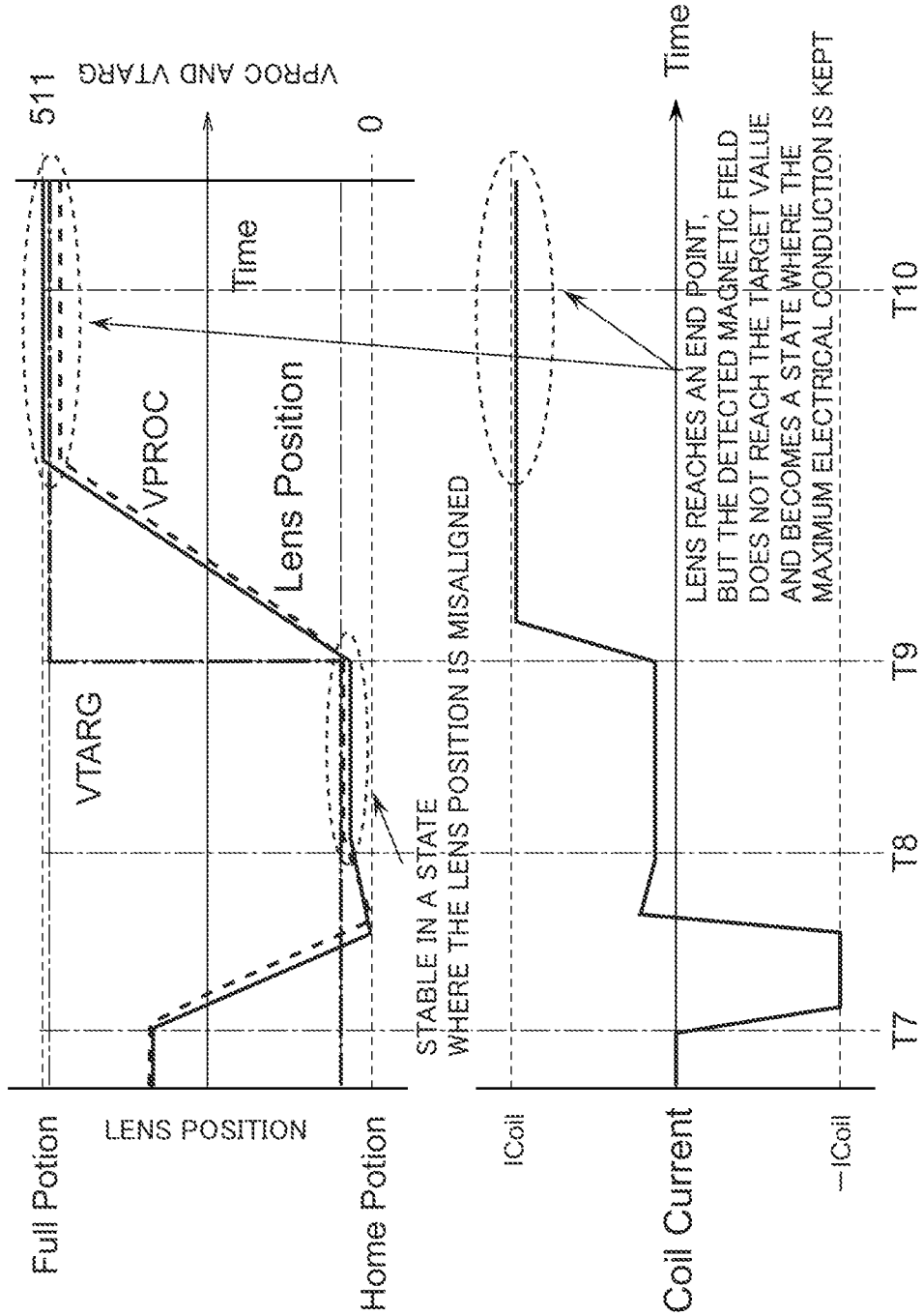
FIG. 8A and FIG. 8B are views illustrative of relationships between the driving coil electric current and the lens position control with the passage of time at the operation of position control when influenced by the leak magnetic field.

FIG. 8A and FIG. 8B are views illustrative of relationships between the driving coil electric current and the lens position control with the passage of time at the operation of position control when influenced by the leak magnetic field. FIG. 8A is a view illustrative of relationships between the position operation signal VPROC and the target position signal VTARG corresponding to the home position (Home Potion) and the full position (Full Potion) of the lens position in the passage of time, after the calibration operation is performed, and a solid line indicates the lens position, a dotted line indicates the position operation signal VPROC, and a dashed line indicates the target position signal VTARG. FIG. 8B is a view illustrative of a driving coil electric current with the passage of time.

When influenced by the leak magnetic field, the PID control circuit 25 controls the position operation signal VPROC and the target position signal VTARG to be equal to each other, and the lens position according to the target position signal VTARG is stabled in time T8. The driving coil electric current at this time begins to supply the electric current to move the lens to the home position from time T7 when the position control starts, only the electric current necessary to hold the lens position is supplied in time T8 when the lens position becomes stable. However, a leak magnetic field is occurring from the driving coil even at the stability, and the position operation signal VPROC takes a value to or from which the leak magnetic field is added or subtracted. Accordingly, the position of the lens at the time of stability becomes the position deviated from a position to which the lens is originally intended to move by the influence of the leak magnetic field.

Moreover, when the target position signal VTARG is changed in time T9, the driving coil electric current begins to supply the electric current to move the lens to the full position from time T9 when the target position is changed, so that the lens becomes in a stable condition at the lens position corresponding to the target position VTARG in time T10 by the control of the PID control circuit 25 again. However, when the target position signal VTRAG is set in time T9 to a value unobtainable by adding or subtracting the leak magnetic field to or from the position operation signal VPROC, the position control is impossible, and the lens position remains fixed at the full position. Thus, even in time T10 when the lens position of not being influenced from the leak magnetic field is stabled, the current flowing across the driving coil is in a state of maintaining the maximum value.

Figure 9A:
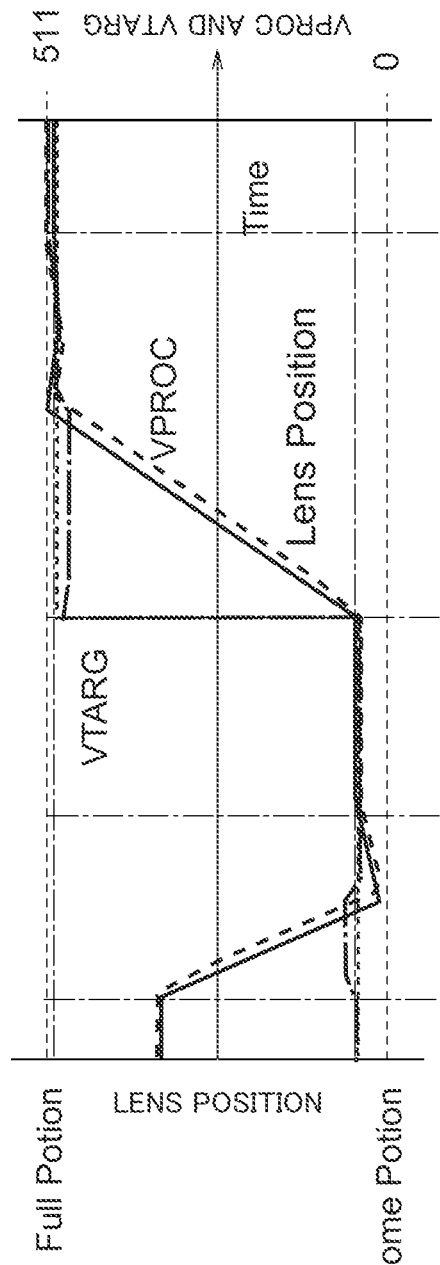
FIG. 9A and FIG. 9B are views illustrative of relationships between the driving coil electric current and the lens position control with the passage of time at the operation of position control.
Figure 9B:
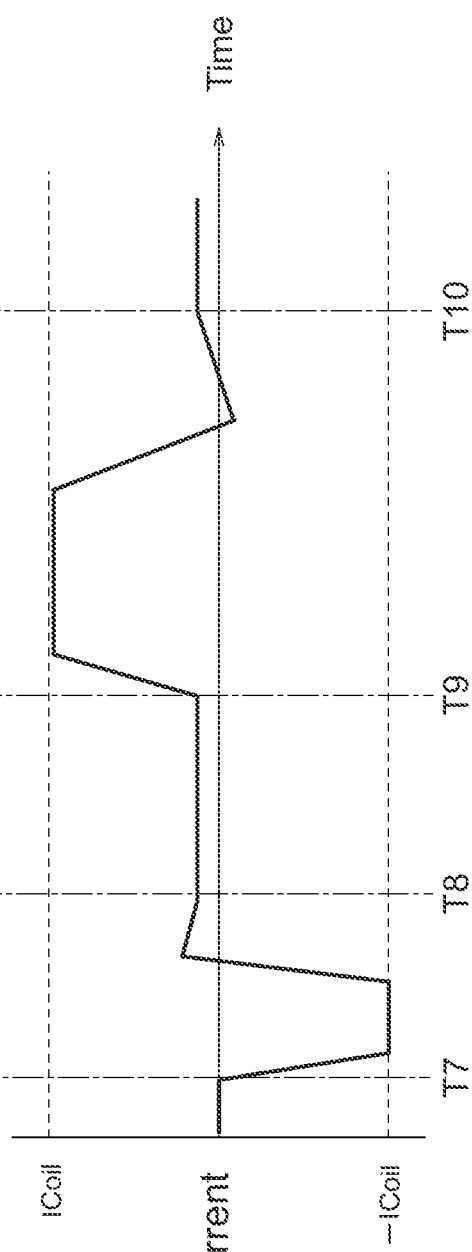

FIG. 9A and FIG. 9B are views illustrative of relationships between the driving coil electric current and the lens position control with the passage of time at the operation of position control, and also illustrates the leak magnetic field corrected by the PID control circuit. FIG. 9A is a view illustrative of relationships between the position operation signal VPROC and the target correction position signal VTARG' corresponding to the home position (Home Position) and the full position (Full Position) of the lens position with the passage of time, after the calibration operation is performed, and a solid line indicates the lens position, a dotted line indicates the position operation signal VPROC, and a dashed line indicates the target correction position signal VTARG'. FIG. 9B is a view illustrative of a driving coil electric current with the passage of time.

When the influence of the leak magnetic field is reduced, the PID control circuit 25 controls the position operation signal VPROC and the target correction position signal VTARG' to be equal to each other, and is stable at the lens position corresponding to the target correction position signal VTARG' in time T8. As to the driving coil electric current at this time, the current begins to be supplied for moving the lens to the home position from time T7 when the position control starts, and only the electric current necessary to hold the lens position in time T8 when the lens position becomes stable is supplied. Here, a leak magnetic field is occurring from the driving coil even at the stability, and the position operation signal VPROC takes a value to or from which the leak magnetic field is added or subtracted.

However, the target correction position signal VTARG' takes a value obtained by subtracting, from the target position signal VTRAG, the influence of the leak magnetic field that is the correction value calculated from the magnetic field correction value LEAKB and the output from the PID control circuit 25 obtained at the time of calibration. Thus, the position of the lens at the time of stability is same as a position to which the lens is originally intended to move.

Also, when the target position signal VTARG is changed in time T9, the driving coil electric current begins to supply the electric current to move the lens to the full position from time T9 when the target position is changed, so that the lens becomes in a stable condition at the lens position corresponding to the target position VTARG in time T10 by the control of the PID control circuit 25 again. When the target position signal VTRAG' is set in time T9 to an unobtainable value by adding or subtracting the leak magnetic field to or from the position operation signal VPROC is an unobtainable value, the position control is impossible, and the lens position remains fixed at the full position. However, the target correction position signal VTARG' takes a value obtained by subtracting, from the target position signal VTRAG, the influence of the leak magnetic field that is the correction value calculated from the magnetic field correction value LEAKB and the output from the PID control circuit 25 obtained at the time of calibration. Accordingly, the target correction position signal VTARG' does not take unobtainable value by adding or subtracting the leak magnetic field to or from the position operation signal VPROC is not an, and the position control does not become impossible.

Further, similarly to time T8 when the lens position is stable, the target correction position signal VTARG' takes a value obtained by subtracting, from the target position signal VTRAG, the influence of the leak magnetic field that is the correction value calculated from the magnetic field correction value LEAKB and the output from the PID control circuit 25 obtained at the time of calibration. Thus, the position of the lens at the time of stability is same as a position to which the lens is originally intended to move.

As described above, in the case where the positional misalignment of the mounting position of the magnetic sensor or the magnetization variation of the magnet occurs, or in the case where the magnetic field detected by the magnetic sensor receives the interference of the magnetic field generated by the driving coil of the linear motion device, it is possible to provide the controller of the linear motion device capable of controlling the position of the linear motion device accurately.

It is to be noted that the influence of the leak magnetic field that is the magnetic field correction value LEAKB obtained at the time of calibration is added to the position operation signal VPROC, in some embodiments.

FIG. 10 is a view of a flowchart illustrative of a control method of the linear motion device, in some embodiments of the present disclosure.

According to the control method in the controller 20 of the linear motion device 31, in some embodiments of the present disclosure, the linear motion device 31 having the magnet 32 attached to the moving body 33, and the driving coil 29 arranged in the vicinity of the magnet 32 of the linear motion device 31 are provided, so that the magnet 32 is moved by a power generated by the coil electric current flown across the driving coil 29.

Firstly, there are provided a step (S1) of detecting, by the magnetic field sensor 21, the magnetic field generated by the magnet 32 and outputting the detection position signal value corresponding to the value of the detected magnetic field, and then a step (S2) of obtaining, by the calibration operation circuit 24, the first position signal value NEGCAL corresponding to the home position, the first position signal value NEGCAL' when influenced by the leak magnetic field, and the second position signal value POSCAL corresponding to the full position of the linear motion device 31, with a period of stopping the electric power supply to the driving coil 29 immediately before the detected magnetic field is obtained, so as to prevent the influence of the leak magnetic field by the driving coil 29 on the magnetic field sensor 21.

Next, there are further provided a step (S3) of obtaining the detection position operation signal value VPROC from the first position signal value NEGCAL corresponding to the home position and the second position signal value POSCAL corresponding to the full position of the linear motion device 31, and obtaining the magnetic field correction value LEAKB from the first position signal value NEGCAL corresponding to the home position of the linear motion device 31, the first position signal value NEGCAL' when influenced by the leak magnetic field, and the second position signal value POSCAL corresponding to the full position of the linear motion device 31, a step (S4) of outputting, by the device position instruction signal generation circuit 26, the target position signal value to instruct the target position to which the linear motion device 31 is to move, and a step (S5) of correcting, by the leak magnetic field correction circuit 34, the target position signal value (VTARG) from the device position instruction signal generation circuit 26, and obtaining the target correction position signal value (VTARG').

Next, there are further provided a step (S6) of receiving, by the PID control circuit 25, the detection position operation signal value VPROC from the calibration operation circuit 24 and the target correction position signal value VTARG' from the leak magnetic field correction circuit 34, and outputting a control signal to move the moving body 33 to the target position in accordance with the current position of the moving body 33 and the target position of the moving body 33 instructed by the target correction position signal value VTARG', and a step (S7) of supplying, by the output drivers 28a and 28b, the driving currents to the driving coil 29 based upon the detection position operation signal value and the target correction position signal value, even if the detection position signal value Vip has a variation, the position control of the linear motion device 31 is enabled by the target position signal value VTARG. It is to be noted that when the position control is successively repeated, steps S3 to S7 are repeated.

In addition, the detection position operation signal value VPROC of the calibration operation circuit 24 has a proportional relationship to (Vip−NEGCAL)/(POSCAL−NEGCAL), where Vip is the detection position signal value from the magnetic sensor 21 that is the input signal value to the calibration operation circuit 24, NEGCAL is the first position signal value corresponding to the home position, POSCAL is the second position signal value corresponding to the full position, and VPROC is the detection position operation signal value that is the output signal value from the calibration operation circuit 24.

Further, the magnetic field correction value LEAKB of the leak magnetic field correction circuit 34 has a relationship of (POSCAL−POSCAL')/(POSCAL−NEGCAL) or (NEGCAL'−NEGCAL)/(POSCAL−NEGCAL), where NEGCAL is the first position signal value corresponding to the home position, NEGCAL' is the first position signal value when influenced by the leak magnetic field, POSCAL is the second position signal value corresponding to the full position, and POSCAL' is the second position signal value by the leak magnetic field, and VPROC is the detection position operation signal value that is an output signal value from the calibration operation circuit.

Figure 11:
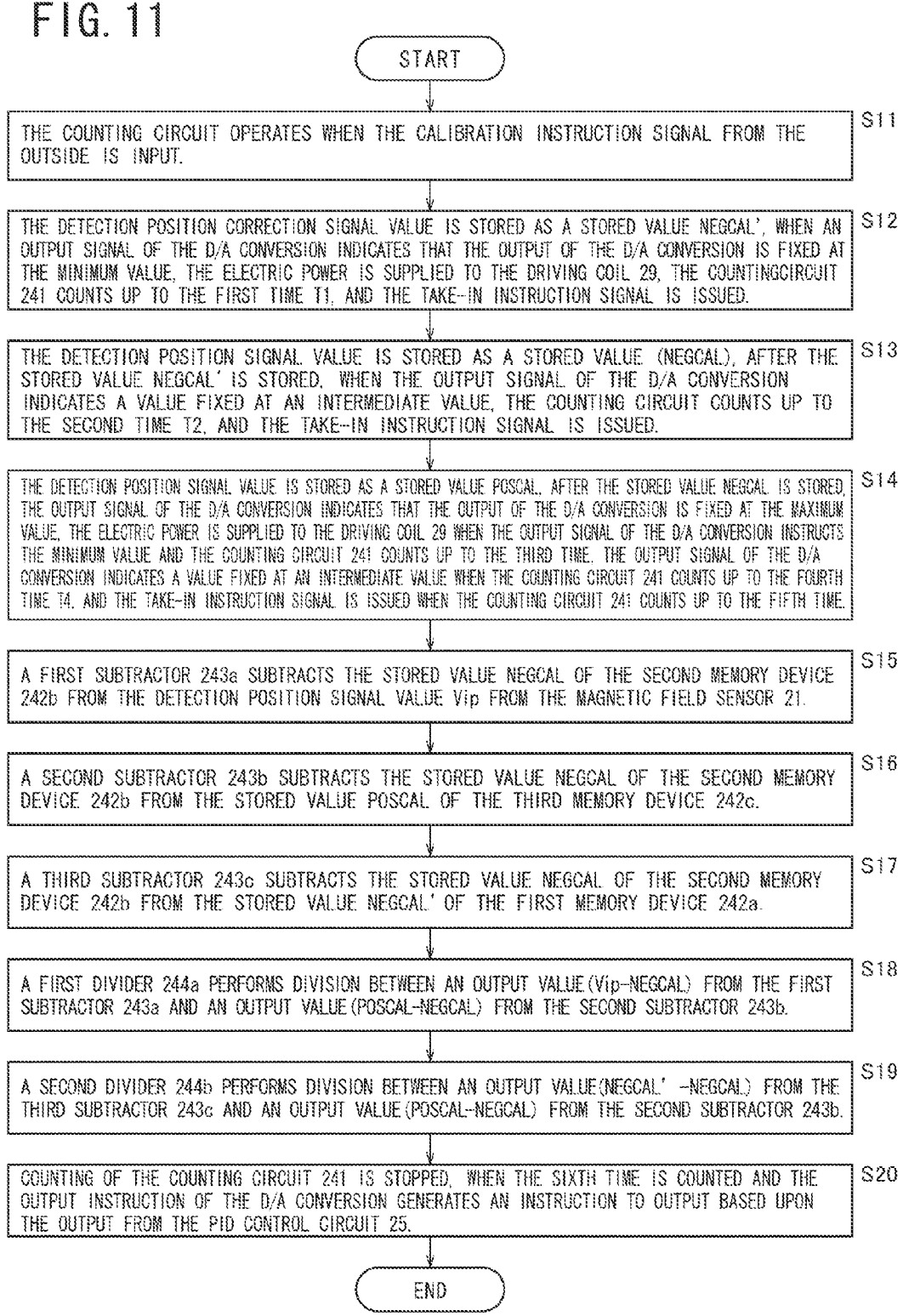
FIG. 11 is a view of a flowchart illustrative of an operation method, by the calibration operation circuit.

FIG. 11 is a view of a flowchart illustrative of an operation method, by the calibration operation circuit.

An operation step with calibration operation circuit 24, includes a step (S11) of operating, by the counting circuit, when the calibration instruction signal from the outside is input, a step (S12) of storing the detection position correction signal value as a stored value NEGCAL', when an output signal of the D/A conversion indicates that the output of the D/A conversion is fixed at the minimum value, the electric power is supplied to the driving coil 29, the counting circuit 241 counts up to the first time T1, and the take-in instruction signal is issued, and a step (S13) of storing the detection position signal value as a stored value (NEGCAL), after the stored value NEGCAL' is stored, when the output signal of the D/A conversion indicates a value fixed at an intermediate value, the counting circuit counts up to the second time T2, and the take-in instruction signal is issued.

Next, there is further provided a step (S14) of storing the detection position signal value as a stored value POSCAL, after the stored value NEGCAL is stored, the output signal of the D/A conversion indicates that the output of the D/A conversion is fixed at the maximum value, the electric power is supplied to the driving coil 29 when the output signal of the D/A conversion indicates the minimum value and the counting circuit 241 counts up to the third time, the output signal of the D/A conversion indicates a value fixed at an intermediate value when the counting circuit 241 counts up to the fourth time T4, and the take-in instruction signal is issued when the counting circuit 241 counts up to the fifth time.

In addition, there are further provided a step (S15) of subtracting, by a first subtractor 243a, the stored value NEGCAL of the second memory device 242b from the detection position signal value Vip from the magnetic field sensor 21, a step (S16) of subtracting, by a second subtractor 243b, the stored value NEGCAL of the second memory device 242b from the stored value POSCAL of the third memory device 242c, a step (S17) of subtracting, by a third subtractor 243c, the stored value NEGCAL of the second memory device 242b from the stored value NEGCAL' of the first memory device 242a, a step (S18) of performing division, by a first divider 244a, between an output value (Vip−NEGCAL) from the first subtractor 243a and an output value (POSCAL−NEGCAL) from the second subtractor 243b, and a step (S19) of performing division, by a second divider 244b, between an output value (NEGCAL'−NEGCAL) from the third subtractor 243c and an output value (POSCAL−NEGCAL) from the second subtractor 243b.

Then, a step (S20) of stopping the counting of the counting circuit 241, when the sixth time is counted and the output instruction of the D/A conversion generates an instruction to output based upon the output from the PID control circuit 25. The detection position operation signal value VPROC of the calibration operation circuit 24 has a proportional relationship to (Vip−NEGCAL)/(POSCAL−NEGCAL) and the magnetic field correction value LEAKB by the leak magnetic field correction circuit 34 has a proportional relationship to (POSCAL−POSCAL')/(POSCAL−NEGCAL) or (NEGCAL'−NEGCAL)/(POSCAL−NEGCAL).

FIG. 12 is a view of a flowchart illustrative of an operation method, by the leak magnetic field correction circuit.

There are provided a step (S21) of performing division, by a divider 342, between the maximum value MVmax of the control amount stored in the memory device 341 and the magnetic field correction value LEAKB from the calibration operation circuit 24, a step (S22) of multiplying, by a multiplier 343, the output value from the divider 342 and the control amount MV, and a step (S23) of performing subtraction, by a subtractor 344, between the output value from the multiplier 343 and the target position signal value VTARG from the device position instruction signal generation circuit 26, so as to output the target correction position signal value VTARG'.

As described heretofore, in a case where a misalignment of the mounting position of a magnetic sensor or a magnetization variation of a magnet occurs, or in a case where a magnetic field detected by the magnetic sensor receives an interference of the magnetic field generated by a driving coil of the linear motion device, it is possible to achieve a control method of the linear motion device capable of controlling the position of the linear motion device accurately.

In addition, the leak magnetic field correction circuit (34) may correct the target position signal value (VTARG).

Further, a detection position operation signal value VPROC may have a proportional relationship to (Vip−NEGCAL)/(POSCAL−NEGCAL), where Vip is the detection position signal value (Vip) from the magnetic field sensor (21) and is an input signal value to the calibration operation circuit (24), NEGCAL is the first position signal value, POSCAL is the second position signal value, and VPROC is the detection position operation signal value that is an output signal value from the calibration operation circuit (24).

Furthermore, a magnetic field correction value LEAKB may have a proportional relationship to (POSCAL−POSCAL')/(POSCAL−NEGCAL) or (NEGCAL'−NEGCAL)/(POSCAL−NEGCAL), where NEGCAL' is the first position signal value when influenced by the leak magnetic field, and POSCAL' is the second position signal value by the leak magnetic field.

Moreover, the calibration operation circuit (24) may comprise: a first memory device (242a) configured to store the first position signal value NEGCAL' when influenced by the leak magnetic field or the second position signal value POSCAL' by the leak magnetic field; a second memory device (242b) configured to store the first position signal value NEGCAL; and a third memory device (242c) configured to store the second position signal value POSCAL.

Additionally, the calibration operation circuit (24) may further comprise: a first subtractor (243a) configured to subtract the first position signal value NEGCAL stored in the second memory device (242b) from the detection position signal value Vip from the magnetic field sensor; a second subtractor (243b) configured to subtract the first position signal value NEGCAL stored in the second memory device (242b) from the second position signal value POSCAL stored in the third memory device; a third subtractor (243c) configured to subtract the first position signal value NEGCAL stored in the second memory device from the first position signal value NEGCAL' stored in the first memory device, or subtract the second position signal value POSCAL' stored in the first memory device from the second position signal value POSCAL stored in the third memory device; a first divider (244a) configured to divide an output value (Vip−NEGCAL) from the first subtractor with the output value (POSCAL−NEGCAL) from the second subtractor; and a second divider (244b) configured to divide an output value (NEGCAL'−NEGCAL) from the third subtractor with an output value (POSCAL−NEGCAL) from the second subtractor, or divide an output value (POSCAL−POSCAL') from the third subtractor with the output value (POSCAL−NEGCAL) from the second subtractor.

In addition, the leak magnetic field correction circuit may comprise: a divider configured to divide the magnetic field correction value with a maximum value of a control amount stored in a memory device; a multiplier configured to multiple an output value from the divider with a control amount of the output driver; and a subtractor configured to subtract the device position instruction signal generation circuit from an output value from the multiplier from the target position signal value, wherein the leak magnetic field correction circuit configured to output a target correction position signal value in which the target position signal value may be corrected.

Further, the magnetic field sensor may be a Hall element.

Furthermore, the linear motion device and the driving coil may be configured to be incorporated into a camera module.

In addition, according to another aspect of the present invention, there is provided a control method of a linear motion device, the linear motion device comprising a magnet attached to a moving body; and a driving coil disposed in a vicinity of the magnet of the linear motion device, the driving coil being configured to move the magnet, the control method comprising: detecting, by a magnetic field sensor, a magnetic field generated by the magnet and outputting a detection position signal value corresponding to a value of a detected magnetic field; obtaining, by a calibration operation circuit, a detection position operation signal value from a first position signal value corresponding to a first position of the linear motion device and a second position signal value corresponding to a second position of the linear motion device, based upon the detection position signal value from the magnetic field sensor; outputting, by a device position instruction signal generation circuit, a target position signal value to instruct the target position to which the linear motion device is to move; supplying, by an output driver, a driving current to the driving coil based upon the detection position operation signal value and the target position signal value; and correcting, by a leak magnetic field correction circuit, a detection error of the magnetic field sensor due to a leak magnetic field of the driving coil based upon a difference between the detection position signal value when an electric power is not supplied to the driving coil and the detection position signal value when the electric power is not supplied to the driving coil.

Further, in the correcting by the leak magnetic field correction circuit, the target position signal value may be corrected.

Furthermore, a detection position operation signal value VPROC may have a proportional relationship to (Vip−NEGCAL)/(POSCAL−NEGCAL), where Vip is the detection position signal value from the magnetic field sensor and is an input signal value to the calibration operation circuit, NEGCAL is the first position signal value, POSCAL is the second position signal value, and VPROC is the detection position operation signal value that is an output signal value from the calibration operation circuit.

Moreover, a magnetic field correction value LEAKB may have a proportional relationship to (POSCAL−POSCAL'/(POSCAL−NEGCAL) or (NEGCAL'−NEGCAL)/(POSCAL−NEGCAL), where NEGCAL' is the first position signal value when influenced by the leak magnetic field, and POSCAL' is the second position signal value by the leak magnetic field.

Additionally, the obtaining, by the calibration operation circuit, may comprise: storing in a first memory device the first position signal value NEGCAL' when influenced by the leak magnetic field or the second position signal value POSCAL' by the leak magnetic field; storing in a second memory device the first position signal value NEGCAL; and storing in a third memory device the second position signal value POSCAL.

Further, the obtaining, by the calibration operation circuit, may comprise: subtracting, by a first subtractor, the first position signal value NEGCAL stored in the second memory device from the detection position signal value Vip from the magnetic field sensor; subtracting, by a second subtractor, the first position signal value NEGCAL stored in the second memory device from the second position signal value POSCAL stored in the third memory device; subtracting, by a third subtractor, the first position signal value NEGCAL stored in the second memory device from the first position signal value NEGCAL' stored in the first memory device, or subtracting the second position signal value POSCAL' stored in the first memory device from the second position signal value POSCAL stored in the third memory device; dividing, by a first divider, an output value (Vip−NEGCAL) from the first subtractor with the output value (POSCAL−NEGCAL) from the second subtractor; and dividing, by a second divider, an output value (NEGCAL'−NEGCAL) from the third subtractor with an output value (POSCAL−NEGCAL) from the second subtractor, or dividing an output value (POSCAL−POSCAL') from the third subtractor with the output value (POSCAL−NEGCAL) from the second subtractor.

Furthermore, the correcting, by the leak magnetic field correction circuit, may comprise: dividing, by a divider, the magnetic field correction value with a maximum value of a control amount stored in a memory device; multiplying, by a multiplier, an output value from the divider with a control amount of the output driver; and subtracting, by a subtractor, the device position instruction signal generation circuit from an output value from the multiplier from the target position signal value, wherein a target correction position signal value in which the target position signal value is corrected may be output.

REFERENCE SIGNS LIST 9 lens
10 magnet
11 coil
12 linear motion device
13 magnetic field sensor
14 differential amplifier
15 non-inverting output buffer
16 inverting output buffer
17 first output driver
18 second output driver
20 controller
21 magnetic field sensor
22 amplifier
23 A/D converter circuit
24 calibration (Calibration) operation circuit
25 PID control circuit
26 device (lens) position instruction signal generation circuit
27 D/A converter circuit
28a first output driver
28b second output driver
29 driving coil
30 camera module 31 linear motion device
32 magnet
33 lens (moving body)
34 leak magnetic field correction circuit
241 counting circuit (counter/timer)
242a first memory device (register/memory)
242b second memory device (register/memory)
242c third memory device (register/memory)
243a first subtractor
243b second subtractor
243c third subtractor
244a first divider
244b second divider
245a first multiplier
245b second multiplier
246 fourth memory device (register/memory)
341 memory device (register/memory)
342 divider
343 multiplier
344 subtractor

The invention claimed is:

1. A controller of a linear motion device including a magnet attached to a moving body and disposed adjacent to a driving coil, the controller comprising:
a magnetic field sensor configured to detect a magnetic field generated by the magnet and output a detection position signal value corresponding to a value of the magnetic field;
a calibration operation circuit configured to obtain the detection position signal value and generate a detection position operation signal value;
a device position instruction signal generation circuit configured to output a target position signal value for instructing a target position to which the linear motion device is to move;
a leak magnetic field correction circuit configured to correct the target position signal value and output a target correction position signal value;
a PID control circuit configured to output a control signal based on the detection position operation signal value and the target correction position signal value; and
an output driver configured to supply a driving current to the driving coil to move the moving body to the target position based on the control signal,
wherein the leak magnetic field correction circuit is configured to correct the target position signal value based on the control signal and a value of a leak magnetic field caused by the driving coil, and the value of the leak magnetic is calculated based on a difference between the detection position signal value when an electric power is not supplied to the driving coil and the detection position signal value when the electric power is supplied to the driving coil.

2. The controller of the linear motion device according to claim 1, wherein the leak magnetic field correction circuit is configured to correct the target position signal value based on the value of the leak magnetic field and a maximum value of the control signal.

3. The controller of the linear motion device according to claim 2, wherein the leak magnetic field correction circuit is configured to operate a leak magnetic field correction amount by use of the control signal and a coefficient obtained by dividing the value of the leak magnetic field with the maximum value of the control signal, and to subtract the leak magnetic field correction amount from the target position signal value to correct the target position signal value.

4. The controller of the linear motion device according to claim 1, further comprising an Analog/Digital (A/D) converter circuit configured to perform an A/D conversion on a detection position signal that has been detected by a magnetic field sensor configured to detect the magnetic field generated by the magnet, and to output the detection position signal value,
wherein the output driver comprises a Proportional Integral Derivative or Differential (PID) control circuit configured to output the control signal based on the detection position signal value and the target position signal value that has been corrected by the leak magnetic field correction circuit.

5. The controller of the linear motion device according to claim 1, wherein the calibration operation circuit calculates the value of the leak magnetic field.

6. The controller of the linear motion device according to claim 1,
wherein the detection position signal value that is VPROC has a proportional relationship to (Vip−NEGCAL)/(POSCAL−NEGCAL), where Vip is the detection position signal value from the calibration operation circuit, NEGCAL is a first position signal value deriving from the detection position signal value and corresponding to a first position of the linear motion device, POSCAL is a second position signal value deriving from the detection position signal and corresponding to a second position of the linear motion device, and VPROC is the detection position signal value that is an output signal value from the calibration operation circuit.

7. The controller of the linear motion device according to claim 6, wherein the value of the magnetic field that is LEAKB has a proportional relationship to (POSCAL−POSCAL')/(POSCAL−NEGCAL) or (NEGCAL'−NEGCAL)/(POSCAL−NEGCAL), where NEGCAL' derives from the detection position signal and is the first position signal value when influenced by the leak magnetic field, and POSCAL' derives from the detection position signal and is the second position signal value when influenced by the leak magnetic field.

8. The controller of the linear motion device according to claim 7, wherein the calibration operation circuit comprises:
a first memory device configured to store the first position signal value NEGCAL' or the second position signal value POSCAL';
a second memory device configured to store the first position signal value NEGCAL;
a third memory device configured to store the second position signal value POSCAL;
a first subtractor configured to subtract the first position signal value NEGCAL stored in the second memory device from the detection position signal value Vip;
a second subtractor configured to subtract the first position signal value NEGCAL stored in the second memory device from the second position signal value POSCAL stored in the third memory device;
a third subtractor configured to subtract the first position signal value NEGCAL stored in the second memory device from the first position signal value NEGCAL' stored in the first memory device, or subtract the second position signal value POSCAL' stored in the first memory device from the second position signal value POSCAL stored in the third memory device;
a first divider configured to divide an output value (Vip−NEGCAL) from the first subtractor with the output value (POSCAL−NEGCAL) from the second subtractor; and a second divider configured to divide an output value (NEGCAL'−NEGCAL) from the third subtractor with an output value (POSCAL−NEGCAL) from the second subtractor, or divide an output value (POSCAL−POSCAL') from the third subtractor with the output value (POSCAL−NEGCAL) from the second subtractor.

9. The controller of the linear motion device according to claim 8, wherein the leak magnetic field correction circuit comprises:
a divider configured to divide the value of the magnetic field with the maximum value of the control signal stored in a memory device;
a multiplier configured to multiple an output value from the divider by the control signal of the output driver; and
a subtractor configured to subtract the device position instruction signal generation circuit from an output value from the multiplier from the target position signal value,
wherein the leak magnetic field correction circuit is configured to output a target correction position signal value in which the target position signal value is corrected.

10. The controller of the linear motion device according to claim 1, wherein the magnetic field sensor is a Hall element.

11. The controller of the linear motion device according to claim 1, wherein the linear motion device and the driving coil are configured to be incorporated into a camera module.

12. A calibration method of a controller of a linear motion device, the linear motion device comprising a driving coil configured to move the linear motion device; a magnetic field sensor configured to detect a magnetic field of the magnet, the calibration method comprising:
supplying a drive current to the driving coil to move the linear motion device to a first position;
obtaining in the first position a detection position signal value corresponding to a value of the magnetic field that has been detected by the magnetic field sensor, when an electric power is supplied to the driving coil;
obtaining in the first position the detection position signal value corresponding to the value of the magnetic field that has been detected by the magnetic field sensor, when supplying the electric power to the driving coil is stopped;
supplying the drive current to the driving coil to move the linear motion device to a second position;
obtaining in the second position the detection position signal value corresponding to the value of the magnetic field that has been detected by the magnetic field sensor, when supplying the electric power to the driving coil is stopped; and
correcting a target position signal value for instructing a target position to which the linear motion device is to move by use of a value of a leak magnetic field that has been calculated based on
the detection position signal value corresponding to a value of the magnetic field that has been detected by the magnetic field sensor, when an electric power is supplied to the driving coil in the first position,
the detection position signal value corresponding to the value of the magnetic field that has been detected by the magnetic field sensor, when supplying the electric power to the driving coil is stopped in the first position, and
the detection position signal value corresponding to the value of the magnetic field that has been detected by the magnetic field sensor, when supplying the electric power to the driving coil is stopped.

13. A controller of a linear motion device, the controller comprising:
a device position instruction signal generation circuit configured to output a target position signal value for instructing a target position to which the linear motion device including a magnet attached to a moving body is to move;
a leak magnetic field correction circuit configured to correct a detection position signal value obtained by detecting a magnetic field generated by the magnet;
an output driver configured to supply a driving current to a driving coil based on the detection position signal value that has been corrected by the leak magnetic field correction circuit and the target position signal value,
wherein the leak magnetic field correction circuit is configured to correct the detection position signal value based on a value of a leak magnetic field of the driving coil, and
wherein the value of the leak magnetic field is calculated based on a difference between the detection position signal value when an electric power is not supplied to the driving coil and the detection position signal value when the electric power is supplied to the driving coil.

* * * * *